Figures 1, 2:
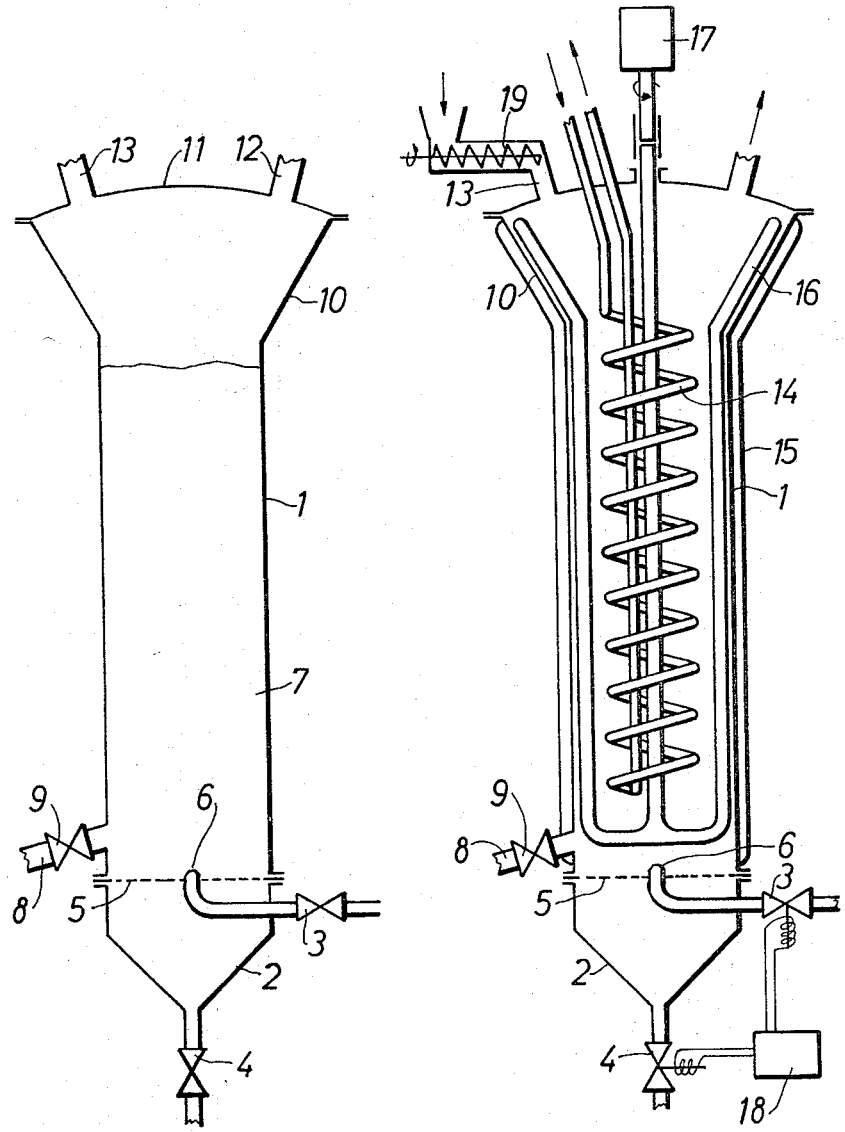

Jan. 3, 1967     ERNEST-ULRICH KÖCHER ET AL     3,296,205
POLYMERIZATION OF GASEOUS FORMALDEHYDE
Filed July 2, 1963

INVENTORS:
ERNST-ULRICH KÖCHER, FRITZ KOLB
BY
their ATTORNEYS

3,296,205
POLYMERIZATION OF GASEOUS
FORMALDEHYDE
Ernest-Ulrich Köcher, Leverkusen, and Fritz Kolb,
Odenthal-Buchmuhle, Germany, assignors to Farbenfabriken Bayer Aktiengesellschaft, Leverkusen, Germany, a German corporation
Filed July 2, 1963, Ser. No. 292,373
Claims priority, application Germany, July 16, 1962,
F 37,322
7 Claims. (Cl. 260—67)

This invention relates to a polymerization process and specifically to the polymerization of gaseous formaldehyde into high molecular weight polyoxymethylenes, said polymerization being carried out in the absence of solvents in a fluidized bed of polyoxymethylene, and to an apparatus for performing said polymerization.

It is known that formaldehyde can be polymerized in the absence of solvents to give high molecular weight technologically useful polyoxymethylenes, either with or without using the known polymerization catalysts. The degree of purity required of the formaldehyde gas passing into the reaction depends on the nature of the catalyst used. In this process, the polyoxymethylene present is generally used as carrier for the fresh polyoxymethylene which is to be produced in the reaction vessel. In the course of polymerization, the proportion of fresh polyoxymethylene progressively increases, and a certain amount of product may be continuously removed so that the desired volume of solids is always present in the reaction chamber. The supply of catalyst may also be regulated so that the required catalyst concentration is constantly maintained.

However, the technical continuous polymerization of the gaseous phase gives rise to considerable difficulties because hard, adhesive polyoxymethylene deposits are liable to form on the cooled surfaces and the polyoxymethylene particles present in the reaction chamber may cake together when gaseous formaldehyde is introduced. In either case, it will be necessary to interrupt the process after a relatively short time in order to clean the apparatus or break down the material to improve the uptake of formaldehyde.

Furthermore, it is already known to keep the polyoxymethylene in constant vigorous motion, as described in U.S. Patent application Ser. No. 263,137, so that the formation of solid incrustations can be avoided.

The use of the usual fluidized bed for carrying out such polymerizations would appear to be an obvious solution but experiments have shown that such a fluidized bed does not solve the problems of formaldehyde polymerization because with a low formaldehyde velocity in space there is a good yield for a time but the polyoxymethylene is not fluidized and finally the whole content of the fluidized bed cakes together, whereas with a high formaldehyde velocity in space the materials can be fluidized but the degree of formaldehyde conversion is low because the time is too short. This difficulty may be countered by using a pulsating fluidized bed in which a fluidized state can be brought about even with small quantities of gas. It is well known that a pulsating gas supply produces a very uniform movement of the material in the fluidized bed.

A process for the polymerization of gaseous formaldehyde in a fluidized bed in the absence of solvents has now been found in which the fluidized state of the polyoxymethylene formed in the fluidized bed is produced by a pulsating gas stream which consists at least partly of the formaldehyde gas that is to be polymerized. At least two separate synchronously pulsating gas streams, one of which consists mainly of formaldehyde gas and the other of a gas that is inert to formaldehyde may be supplied to the fluidized bed. The residual gases which contain formaldehyde are preferably returned to the fluidized bed, pulsating synchronously with the other gas streams, after they have passed through the fluidized bed. The impurities accumulated in the residual gas are removed from it in known manner before it is returned. Additional pulsating fluidized beds may be connected to this system. They are operated without further addition of inert gas. The accumulation of polyoxymethylene is removed continuously or at intervals from the pulsating fluidized bed. A portion of the polyoxymethylene removed may be treated with fresh catalyst and returned to the fluidized bed. Advantageously, the polyoxymethylene is broken up before it is returned. The polymerization catalyst is advantageously introduced into the pulsating fluidized bed in the form of an aerosol.

The materials may be carried most simply by the pressures of the gases themselves in the lower part of the fluidized bed. The pressure difference relative to the residual gas is sufficient for this purpose regardless of the absolute pressures employed.

The catalyst may be introduced in various ways into the fluidized bed, the method used depending mainly on the nature of the catalyst. Catalysts which are sufficiently voltatile may be introduced into the reaction chamber together with the inert gas. Non-volatile or insufficiently voltaile catalysts may be atomised with or without the aid of an auxiliary solvent and then introduced as an aerosol.

The aerosol droplets are deposited on the lightest polyoxymethylene particles. Volatile catalysts (e.g. tertiary amines) can be introduced in the same way in the upper end of the fluidized bed with the aid of solvents. Another possibility consists in coating the surface of an polyoxymethylene already formed (which may be of any origin) by treating said polyoxymethylene with a dilute solution of a catalyst in a suitable easily volatile solvent then removing the solvent and returning the polyoxymethylene to the fluidized bed.

The addition of catalyst in the upper end of the fluidized bed has the advantage that the highest catalyst activity exists where the formaldehyde concentration is lowest. The maximum formaldehyde yields for a given system may be obtained in this way.

The constant introduction of polyoxymethylene produced, while polymerization is taking place is not advantageous for the introduction of the catalyst. An undesirable excessive increase in the bulk weight of the fluidized bed polymer may be prevented by ensuring that the bulk weight of the polyoxymethylene introduced is low or, if necessary, reduced by disintegrating the polyoxymethylene.

For a given duration of dwell, depending on the pressure gradient and the conditions produced by the apparatus and by the extent to which it is filled and by the grain size, the amount of formaldehyde reacted is greater the smaller the quantity of inert gas added. In this respect, the use of an inert gas is a disadvantage but this disadvantage is offset by several advantages which are as follows: The inert gas ensures adequate fluid motion of the polyoxymethylene in the upper zones of the fluidized bed after a portion of the formaldehyde has already polymerized, in other words when the quantity of gas and hence the flow velocity have been reduced. Separate introduction of inert gas makes it possible to remove heat of polymerization because the temperature of the inert gas may be as low as desired. The formaldehyde gas, on the other hand, must be above room temperature on entering the fluidized bed in order to prevent preliminary polymerizations, the required temperature depending on the pressure and content of foreign gases (including any inert gases that have been added). As the heat of polymerization, which is about 35 kcal. per mol $CH_2O$, is very high, this method of controlling the temperature by supplying cold inert gases separately is of considerable importance. Furthermore, it is important to compensate for variations in the flow properties of the polyoxymethylene in the fluidized bed by regulating the quantity of inert gas. These alterations in the flow properties may occur especially shortly after the onset of polymerization when a polyoxymethylene of fibrous structure is used.

Apart from the use of inert gases, the heat of polymerization can be controlled by means of a cooling jacket and/or by means of built in cooling coils. Air or liquid cooling media such as water may be used for cooling. When water is used as cooling medium, the temperature difference between the internal temperature and the temperature of the water should not be more than about 35° C., preferably 20° C., in order to avoid the formation of deposits of polyoxymethylene on the cooling surfaces. In general the temperature of the polymerization reaction may vary from about 0° to about +100° C. The method is suitable for the preparation of polyoxymethylenes by various processes known per se provided they employ a carrier material for the polyoxymethylene that is to be produced. A technologically interesting material and one that is advantageously used for the process is polyoxymethylene itself with an internal viscosity ln $\eta/c$. in the region of 0.5 to 1.2, especially 0.6 to 1.0.

Examples of catalysts that may be used are tertiary amines and phosphines, ammonium salts and phosphonium salts, ureas and thioureas, organometallic compounds such as metal salts of organic and inorganic acids as described in the literature and Patent literature. These catalysts are suitable for the present process even where their use has hitherto been described only for solvent polymerization of $CH_2O$.

In the present process, the degree of purity of the formaldehyde used meets the requirements of the catalyst system used. There are great differences in the degrees of purity required. A process carried out with basic catalysts, e.g. tertiary amines, requires a very highly purified formaldehyde in which the sum of all the impurities (HCOOH, $CH_3OH$, $CH_3$—COOH, $H_2O$) should generally be less than 0.1%. When certain metal salts and hydroxides, e.g. those of divalent tin, are used as catalysts it is permissible to use formaldehyde of a much lower degree of purity. For instance, in the given example the formaldehyde may contain up to 5% of impurities which may be mainly water. Following this general description of the plant according to the invention and suitable processes, particular embodiments of the new plant will now be described.

The apparatus for carrying out the process is shown in the drawings:

FIGURE I is a longitudinal section through a reactor and FIGURE II shows a special form of construction of the apparatus.

In FIGURE I, a vertical reaction cylinder 1 is provided at its lower end with a valve 3 which opens periodically to admit gaseous formaldehyde into reaction chamber 7 through a nozzle 6. An inert gas is introduced through a valve 4 situated at the bottom 2 of the reaction cylinder 1. The valves 3 and 4 are actuated synchronously at a frequency of 0.1 to 1000 impulses per second. A perforated plate 5 over which the pulsating fluidized bed is formed in the reaction cylinder 1 is situated inside the reaction cylinder 1 above the bottom 2 of the cylinder. In its passage through the fluidized bed, the formaldehyde gas is polymerized to the polyoxymethylene present in the cylinder. The top of the reaction cylinder 1 ends in a funnel 10 which acts as a dust separator. Cover 11 contains a discharge pipe 12 through which the residual gases which contain formaldehyde are removed.

In addition, the cover 11 contains an aperture 13 through which the catalyst may be introduced, for example, in the form of an aerosol. A short connecting pipe 8 fitted with a slide 9 is provided for the removal of polyoxymethylene at the lower end of the reaction cylinder 1. The quantity removed may be regulated to maintain the required level of fluidized bed.

FIGURE II shows the reaction cylinder 1 with a cooling coil 14 and a cooling jacket 15. The shaft of a stirrer 16 which is driven by a motor 17, passes through the axis of the cooling coil 14. The blades of the stirrer 16 fit closely to the inner wall of the reaction cylinder 1. This prevents caking of the polyoxymethylene and enables deposited dust to be removed from the funnel 10. The periodically opened valves 3 and 4 are magnetic valves which are actuated by an impulse maker 18 at a frequency of 0.1 to 100 impulses per second, preferably 2 to 100 impulses per second. Polyoxymethylene is periodically removed through the pipe 8 with the aid of the slide 9. A portion of the polymer removed is ground up, impregnated with catalyst solution, and continuously returned to the reaction cylinder 1 through the pipe 13 with the aid of a dosing screw 19.

An additional pulsating fluidized bed constructed like the one described with reference to FIGURE II but without an additional inlet duct for inert gas and operated at a lower temperature than the first fluidized bed may be connected for the purpose of polymerizing the formaldehyde contained in the waste gas. Alternatively, the waste gases in the fluidized bed may be returned to the cycle through the valve 4 after they have passed through a washing apparatus, known per se, for the removal of the impurities accumulated in the gas stream. In this preferred method of carrying out the process it is merely necessary to replace the inert gas that is lost by escaping from the apparatus, e.g. when the product of the reaction is removed. In that case, the gas temperature at the inlet valve 4 must be sufficiently high to prevent preliminary polymerization at the desired conditions of pressure.

EXAMPLE 80 parts of polyoxymethylene were introduced into the fluidized bed apparatus (FIGURE II) described above. The material had previously been impregnated with 0.01% by weight of the divalent tin salt of ethyl caproic acid. Sufficient nitrogen was then introduced through the valve 4 to render the polyoxymethylene uniformly fluidized. The stirrer 17 was then switched on and the cooling apparatus charged with water heated to a temperature of 50°. The stirrer was slowly moved by a motor with transmisison (about 20 to 100 revs./min.). When a temperature of about 40° C. was reached, 174 liters of formaldehyde gas were introduced per hour through the valve 3. The inlet pipe and the valve were heated to 120° C. to prevent preliminary polymerization. At the same time, the supply of nitrogen through the valve 3 was reduced to 158 liters per hour. There was an immediate rise of temperature to about 70° C. in the fluidized bed, indicating the onset of polymerization. The polyoxymethylene produced was removed at intervals. At the same time, a portion of the material removed was returned to the fluidized bed through the pipe 13 after it had been impregnated with 0.02% by weight of the divalent tin salt of ethyl caproic acid, so that the total concentration of the catalyst was always in the region of 0.01% by weight calculated on the quantity of material in the fluidized bed. The conversion rate of the formaldehyde was 43.5% for each passage through the apparatus, the quantity of polyoxymethylene formed when the substance was passed only once through the apparatus being 102 parts per hour. The interval viscosity of the polyoxymethylene obtained after acetylation was between 1.0 and 1.1 measured in a 0.5% solution in butyrolactone at 150° C.

We claim:
1. In the process of polymerizing gaseous formaldehyde by contacting a fluidized bed of polyoxymethylene at a temperature of about 0° C. to about 100° C. with a continuous current of a gaseous feed stream containing formaldehyde in the presence of a formaldehyde polymerization catalyst, the improvement which comprises interrupting the continuous flow of said feed stream at a frequency of from 0.1 to 1000 times per second while maintaining said bed as a fluidized bed.

2. The process of claim 1 wherein said frequency of interruption is from 2 to 100 times per second.

3. The process of claim 1 wherein said formaldehyde polymerization catalyst is tin-II-salt of ethyl caproic acid.

4. The process of claim 3 wherein said formaldehyde catalyst is employed as a surface coating of the polyoxymethylene of said fluidized bed.

5. In the process of polymerizing gaseous formaldehyde by contacting a fluidized bed of polyoxymethylene at a temperature of about 0° C. to about 100° C. with two continuous currents of gaseous feed streams, one of said gaseous feed streams containing formaldehyde and the other of said streams containing a polymerization reaction inert gas, the improvement which comprises continuously and synchronously interrupting the continuous flow of both of said feed streams at a frequency of from 0.1 to 1000 times per second while maintaining said bed as a fluidized bed.

6. The process of claim 5 wherein said frequency of interruption is from 2 to 100 times per second.

7. The process of claim 5 wherein the polymerization reaction inert gas of said other feed stream is nitrogen.

References Cited by the Examiner

UNITED STATES PATENTS

| 2,841,476 | 7/1958 | Dalton | 23—284 |
| 3,005,799 | 10/1961 | Wagner | 260—67 |
| 3,037,848 | 6/1962 | Davis | 23—284 |
| 3,091,599 | 5/1953 | Jean | 260—67 |
| 3,169,938 | 2/1965 | Evers et al. | 260—67 |
| 3,204,012 | 8/1965 | Eguchi et al. | 260—67 |

FOREIGN PATENTS

| 1,285,909 | 1/1962 | France. |
| 1,291,999 | 3/1962 | France. |
| 1,300,492 | 5/1962 | France. |

WILLIAM H. SHORT, *Primary Examiner.*

L. M. MILLER, *Assistant Examiner.*